Sept. 20, 1932.　　R. B. KEELER ET AL　　1,878,780
METHOD AND APPARATUS FOR PRODUCING TILE
Filed Jan. 28, 1931　　4 Sheets-Sheet 2

Inventors
Rufus B. Keeler
Rae Warren Phillips
BY Lyon & Lyon
ATTORNEYS

Sept. 20, 1932.  R. B. KEELER ET AL  1,878,780
METHOD AND APPARATUS FOR PRODUCING TILE
Filed Jan. 28, 1931   4 Sheets-Sheet 3

Inventors
Rufus B. Keeler
Rae Warren Phillips
BY Lyon & Lyon
ATTORNEYS

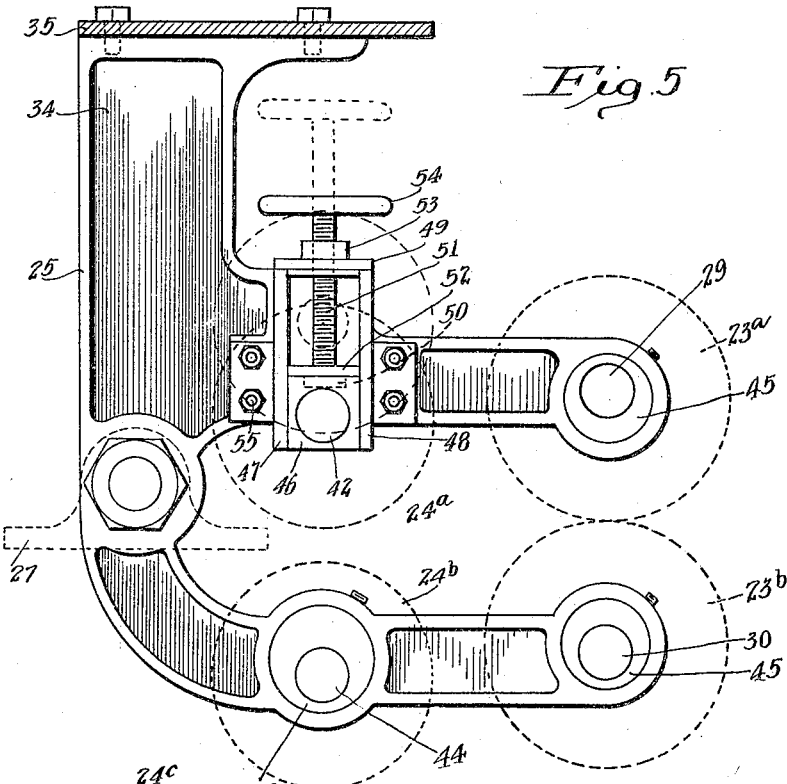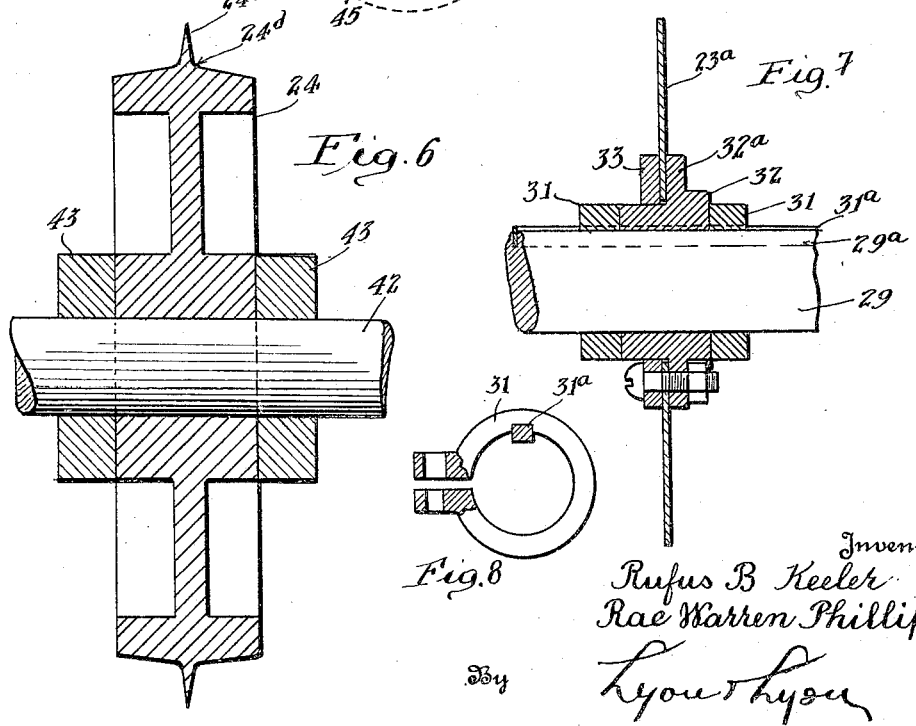

Patented Sept. 20, 1932

1,878,780

UNITED STATES PATENT OFFICE

RUFUS B. KEELER, OF SOUTH GATE, AND RAE WARREN PHILLIPS, OF LOS ANGELES, CALIFORNIA

METHOD AND APPARATUS FOR PRODUCING TILE

Application filed January 28, 1931. Serial No. 511,760.

This invention relates to an improved method of producing tile of various shapes and sizes in a rapid and economical manner. The invention also relates to an apparatus of simple construction, whereby a continuous ribbon of clay or other plastic material may be subdivided into a plurality of tile or blocks accurately and quickly.

By the term "tile" as used herein, particular reference is made to blocks, slabs or other definitely shaped bodies of plastic material. The term "tile" as used herein is also used with particular reference to blocks or bodies made from clay or other plastic moldable material.

Tile of the general character mentioned hereinabove have heretofore been made by hand in individual molds or in gang molds. Attempts have also been made to extrude a thin ribbon of clay or other plastic material and then cut said ribbon into longitudinal sections, each section representing a tile.

An object of this invention is to disclose and provide a method whereby a plurality of tile may be made from a single ribbon of extruded material.

Another object is to disclose and provide a method whereby a single ribbon of clay or other material is cut longitudinally along planes at right angles to each other, and also cut transversely so as to produce a large number of tile from each unit length of the ribbon.

Another object is to disclose and provide a method whereby tile may be cut from a continuous ribbon of extruded material without interrupting the movement of said extruded material.

Another object is to disclose and provide a method whereby tile of various shapes may be produced from a continuous rectangular ribbon of extruded material.

A still further object is to disclose and provide a method of producing a plurality of small tile from a continuous ribbon of material without manually handling said tile.

Another object of this inventon is to disclose and provide an apparatus adapted to produce a plurality of tile or other small bodies from an extruded ribbon of material.

Another object is to disclose and provide means whereby a continuous moving ribbon of plastic material may be subdivided into tile while said ribbon is in motion.

A still further object is to disclose and provide an apparatus capable of producing tile from a continuous ribbon of material in a rapid, simple and effective manner.

Other objects, uses and advantages of this invention will become apparent to those skilled in the art from the following detailed description of one preferred form of apparatus and its mode of operation.

In describing the invention, reference will be had to the appended drawings, in which:

Fig. 5 is a detail side elevational view of the supporting frame for the cutting discs and finishing rollers.

Fig. 6 is a detail sectional view of one of the smoothing or finishing rollers employed with our invention.

Fig. 7 is a detail sectional view of one of the cutting discs.

Fig. 8 is a detail view of one of the clamps employed to hold the disc to its shaft.

Figure 1:
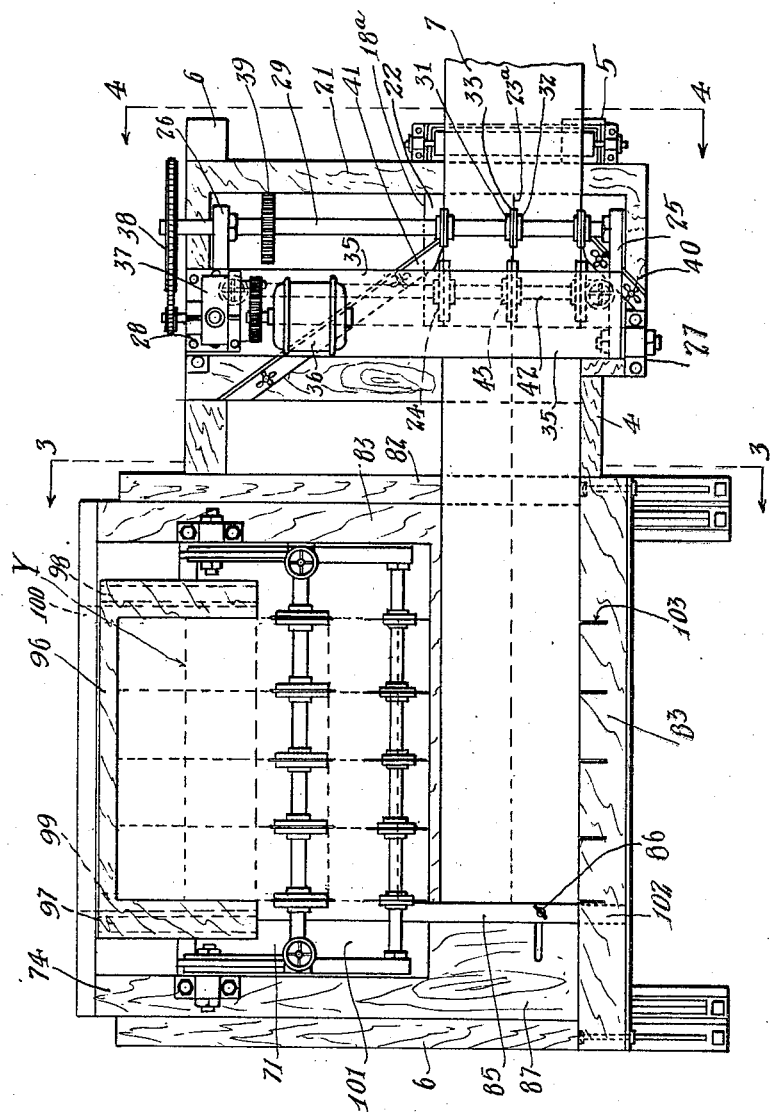
Fig. 1 is a plan view of one form of apparatus embraced by this invention.
Figure 2:
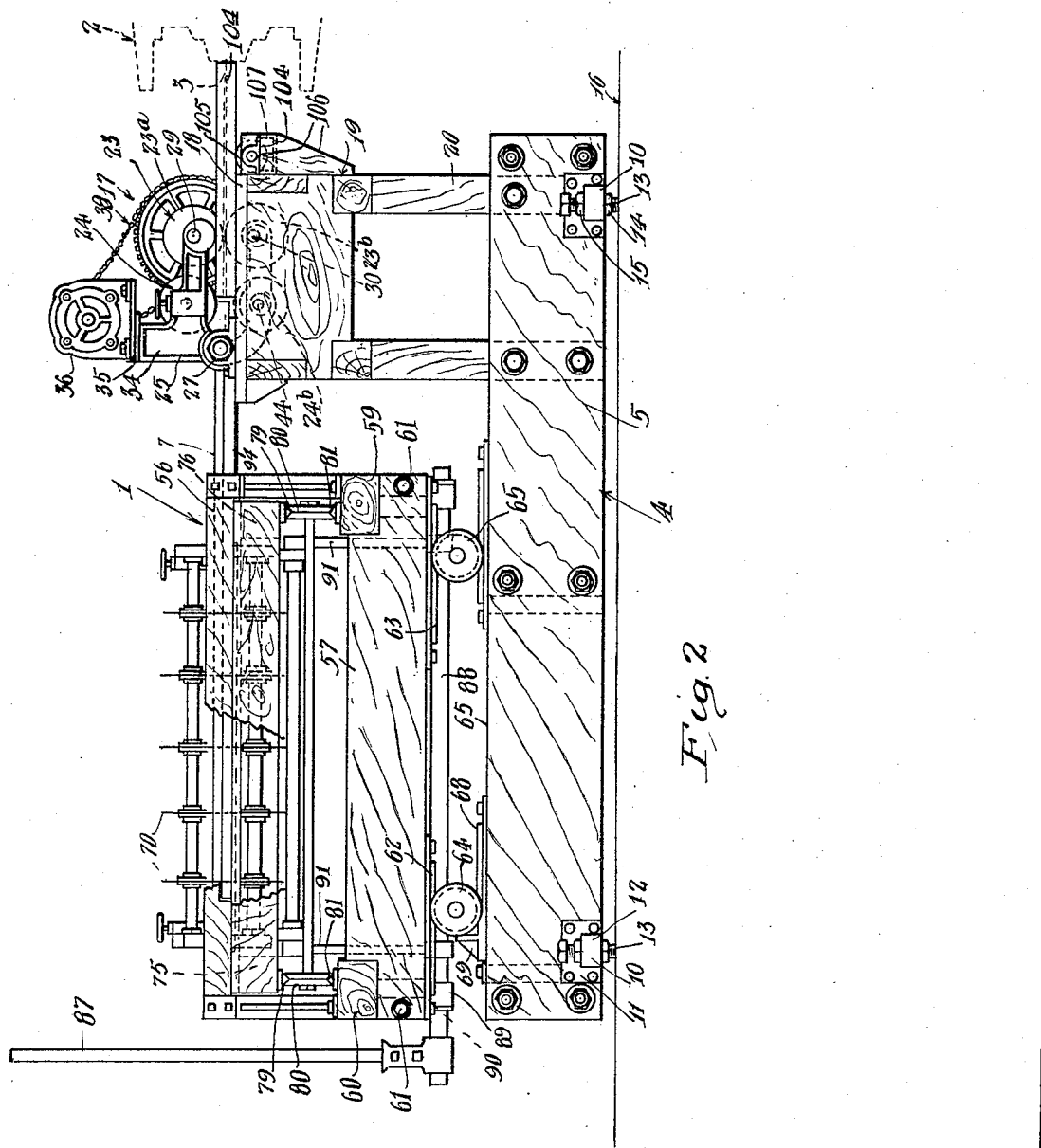
Fig. 2 is a side elevation of the apparatus shown in Fig. 1.

Referring to the drawings, we have illustrated a tile forming machine 1 as located adjacent the opening of an extruding machine or "auger" machine 2, in which clay or other plastic material is mixed to the proper consistency and is extruded in the form of a ribbon, the cross-sectional configuration of which is determined by the opening 3 in the extruding machine.

The tile forming machine comprises a suitable base 4 consisting of a pair of relatively heavy side rails 5 and 6 extending longitudinally in the direction of movement of the extruded ribbon of clay 7. The side rails 5 and 6 are spaced apart by suitable bracing and spacing members 8 and are rigidly secured in place by means of rods 9 which extend transversely between the rails 5 and 6.

The base 4 is adjustably supported upon suitable legs 10, each of which is formed by a plate 11 from which extends a lateral boss 12. An adjusting screw or bolt 13, passing through an opening in the boss 12 and secured thereto by means of lock-nuts 14 and 15, allows for adjustment of the height of the base 4 above the floor level 16.

A splitting table 17 is suitably supported upon that end of the base 4 nearest the extruding machine 2 and comprises a ribbon supporting top 18 supported upon a suitable frame work 19 which is in turn secured to the base 4 as by means of upstanding legs 20. The top 18 of the splitting table comprises an outer frame member 21 defining an opening within which opening is arranged a plurality of splitting cutters 23 and smoothing or finishing rollers 24. A clamp supporting plate 22 extends over the opening immediately adjacent the cutters and rollers, appropriate slots being formed in the plate to accommodate the rollers and cutters.

The cutters 23 are each constituted of a pair of discs 23a and 23b mounted one above the other in a suitable supporting structure comprising a pair of U-shaped frame members 25 and 26 which are respectively pivotally attached by means of suitable brackets 27 and 28 which are in turn secured to the table top 18 in such position that the legs of the U extend horizontally toward the extruding machine 2.

At the outer ends of the upper legs of the U-shaped frame members 25 and 26 there is rotatably secured a shaft 29 upon which the several upper cutting discs 23 are arranged. A similar shaft 30 is arranged between the outer ends of the lower legs of the U-shaped frame members 25 and 26 and lower discs 23b are arranged to be secured to this latter shaft. The discs 23a are attached to the shaft for rotation therewith by means of suitable clamping members 31, one on each side of the discs 23a. A supporting bushing 33 of suitable dimensions is interposed between the clamping member 31 and the disc 23a and has clamped thereto a ring 33, as by a bolt 33a, the ring 33 acting with the flange 32a on bushing 32 to assist in supporting this disc and keeping the same from twisting or warping out of its true plane. The bushing 32 and clamps 31 are provided with a keyway 31a to engage a key 29a inserted in a keyway 29b cut in shaft 29.

Each of the upper discs, of which there may be any number carried upon the shaft 29, are similarly attached to the shaft so that the rotation of the shaft 29 causes all of these discs to be rotated.

Upon an extension 34, constituting an extension of the base portion of the U-shaped frame 25, we have illustrated a plate 35 which extends across the top of the splitting table 17, which in turn constitutes a support for a driving motor 36 connected through suitable reduction gearing 37 and a chain and sprocket drive 38 to rotate the shaft 29.

The lower discs 23b are secured to the lower shaft 30 in a manner similar to that described with reference to the upper discs 23a, and suitable gearing 39 is interposed between the shaft 29 and shaft 30 so that the two shafts will be rotated by the motor 36 at substantially the same speeds and in opposite directions. We prefer that the direction of movement of the discs 23a and 23b shall be in such manner as to assist the movement of the ribbon of clay 7 in its movements across the splitting table.

A metal plate 18a on the top 18 and having openings therethrough to admit the cutting discs 23b, constitutes a support for the ribbon of clay 7 during its passage across the table top 18.

It will be readily seen that with the construction just described, the ribbon of clay 7 in passing across the splitting table will be caused to pass between the various sets of splitting or cutting discs 23 and will therefore be divided longitudinally into a plurality of strips of such widths as may be determined by the spacing of the cutting discs 23 along the shafts 29 and 30.

We have illustrated three of these sets of discs for respectively trimming the outer edges of the ribbon of clay 7 and for splitting the ribbon into two strips, each of which comprises one-half the total width of the ribbon 7.

The excess material which is trimmed off the sides of the ribbon of clay 7 is carried away from the ribbon as by means of suitable guides 40 and 41 arranged respectively in alinement with the outermost sets of cutting discs 23.

The split ribbon of clay 7 passes from the cutting discs 23 to the set of finishing or smoothing roolers 24 which act to smooth any roughened edges of the two strips as may have been caused by the cutting discs 23.

The smoothing or finishing rollers 24 are arranged in a manner similar to that described with reference to the cutting discs 23, that is for each cut made on the ribbon of clay 7, we provide two smoothing or finishing rollers 24, one to be arranged above the ribbon 7 and the other to be arranged below the ribbon 7. The upper smoothing rollers 24a are suitably fixed to a shaft 42 and rotatably secured to the upper legs of the frame members 25 and 26, these rollers being secured to the shaft 42 by means of suitable clamping devices 43 similar in construction to the clamping devices 31 described with reference to the discs 23, but omitting the keyway from these clamps.

The lower set of smoothing or finishing rollers 24b are similarly arranged upon a lower shaft 44 which extends between the lower legs of the frame members 25 and 26.

The smoothing or finishing rollers 24 are illustrated in detail in Fig. 6, and comprise a relatively wide roller 24 having formed thereon an annular flange 24c tapering from a relatively great width at its point of attachment to the roller 24 to a substantial knife edge at the extreme outer periphery of the flange. The base of the flange 24c is preferably filetted, as illustrated at 24d, so as to constitute a smooth junction between the roller 24 and the flange 24c. Also, it will be observed that the face of the roller 24 is provided with a slight taper or rake from the center of the face of the roller so that the contact of the roller 24 with the cut portion of the ribbon of clay 7 will cause the cut to be smooth without an impression of the edge of the roller 24 being made in the ribbon of clay.

Referring, particularly, to Fig. 5, it will be observed that the shafts 29, 30 and 44 are rotatably secured to the frames 25 and 26 as by means of eccentric bushings 45 so that by rotating the bushings 45 the height of the relative positions of the upper and lower cutting discs 23a and 23b, and the relative positions of the smoothing rollers may be adjusted to accommodate wear on the discs and rollers.

It will be further observed that the shaft 42 is arranged to be vertically adjusted with reference to the frames 25, 26 by rotatably securing the shaft 42 to an adjustable slide 46 slidably secured within a frame comprising vertical members 47 and 48 and a top member 49. The slide 46 is formed of two separate pieces, the lower of which receives the shaft 42 and also has a countersunk opening 50 in the top face thereof to receive a circular head formed upon the end of an adjusting screw 51. A top piece 52, having an opening therein of just sufficient size to allow the shaft of the screw 51 to pass therethrough, rotatably secures the screw 51 to the slide 46.

The screw 51 is threaded through the top piece 49 of the frame so that rotation of the screw will cause a lifting or lowering of the slide 46 within the frame. If desired, the threaded engagement of the screw 51 with the top member 49 of the frame may be strengthened by adding a suitably threaded boss 53 to the top member 49. A suitable handle 54, similar to that ordinarily used for operating valves, may be attached to the upper end of the screw 51 to facilitate the adjustment of the screw 51. The slide 46 and the frame 49 may be secured as by means of bolts 55 to the upper leg of the frame member 25.

The construction just described provides for the vertical adjustment of the upper set of rollers 24a to accommodate the smoothing rollers and ribbon of clay 7 to varying thicknesses. Also, it will be observed that if desired the eccentric bushings 45 for the cutting discs 23a and 23b may be suitably adjusted to insure that the contact between the two cutting rollers will occur at substantially the center of the ribbon of clay when ribbons of different thicknesses are passed through the machine.

The ribbon of clay which has now been split passes from the top 18 of the splitting table 17 to a movable carriage 56 upon which further operations may be performed upon the split ribbon of clay 7.

The movable carriage 56 comprises a suitable base structure including a pair of bed rails 57 and 58 extending in the direction of longitudinal movement of the strip of clay 7 and preferably in vertical alinement respectively with the base rails 5 and 6. Cross rails 59 and 60, secured to the bed rails 57 and 58, constitute the other two sides of the base of the carriage 56 and may be secured between the bed rails 57 and 58 as by means of suitable tie rods 61.

On the underneath side of the bed rails 57 and 58, I have illustrated sectional steel tracks 62 and 63 for constituting bearings engaging rollers 64 and 65, respectively.

The sectional steel tracks 62 and 63 are preferably formed with a cross section comprising a flattened base 66 and a V-shaped track face 67 to properly engage a V-groove in the rollers 64 and 65. A complementary set of tracks 68 are secured to the base rails 5 and 6 for engagement with the opposite face of the rollers 64 and 65. The rail, track and roller construction just described, constitutes a rolling support for the carriage 56 which permits reciprocatory movement of the carriage 56 with respect to the splitting table 17. The amount of the reciprocatory movement may be suitably limited by means of the stop members 69 secured to the tracks 62, 63 and 68 at the desired points corresponding to the extreme limit of movement desired for the carriage 56.

The movable carriage 56 is provided with a set of laterally moving cutters 70 and a set of laterally moving smoothing or finishing rollers 71, which are mounted upon a suitable U-frame construction 72, similar in all respects to the U-frame construction described with reference to cutting rollers 23 and smoothing rollers 24 on the splitting table 17. The frames 72 may be pivotally secured, as at 73, to a laterally moving carrier 74 comprising cross rails 75 and 76 constituting two sets of a rectangular frame, the other sides of which form spacing walls 77 and 78, respectively.

The laterally movable carrier 74 is arranged for lateral movement with respect to the carriage 56 as by means of a track 79 secured to the underside of each of the cross rails 75, and 76, preferably of the same cross sectional section as was described with reference to the track 65, for engagement with the U-groove of suitable rollers 80 similar in construction to rollers 64. The cross rail 60, constituting a part of the base of the bed frame of the movable carriage 56, is also provided with complementary tracks 81 for engaging the opposite sides of the rollers 80.

The construction just described constitutes a laterally moving carrier for the lateral cutters 70 and the lateral smoothing rollers 71, which may be moved laterally with respect to the ribbon of clay 7 so as to cut the split ribbon of clay into a plurality of sections of predetermined length each.

By arranging a suitable number of the cutters 70, spaced a predetermined distance apart, the split ribbon of clay 7 may be divided into any desired number of sections of length, corresponding to the setting of the cutters 70.

The movable carriage 56 is arranged to be normally in a position abutting the left-hand edge of the splitting table 17 so that the ribbon of clay 7 passes immediately over the splitting table 17 to a top plate 82, constituting the face of the laterally movable carrier 74 and arranged in alinement with the top plate 18 of the splitting table 17, the moving ribbon of clay 7 being guided in its movement across the top plate 82 by means of a suitable guide bar 83 fixedly secured to braces 84 which are in turn secured to the cross rails 59 and 60 of the movable carriage 56. The ribbon of clay 7 continues across the top 82 until the end of the ribbon 7 abuts upon an adjustable stop member 85, adjustably secured as by wing bolts 86, to the left-hand side of the top plate 82.

The carrier 74 is arranged to be reciprocated laterally across the movable carriage 56 as by means of a suitable handle 87, rigidly attached to a shaft 88, pivotally secured as at 89 to the undersides of suitable bracing members 90, which extend across the movable carriage 56. The shaft 88 is connected as by crankarm 91 to links 92 which in turn are pivotally secured to a shaft 93 which is secured to and extends transverse of the carrier 74.

The operation of our device thus far described is as follows: The ribbon of clay 7, extruded from the forming machine 2, passes across the splitting table 17, where it is split into one or more strips of predetermined dimensions. The split ribbon now continues to the top 82 of the movable carriage 56, being cut out by the guiding bar 83 until the end of the split ribbon engages the stop member 85. At this time the pressure exercised by the moving ribbon of clay 7 causes the movable carriage 56 to move away from the splitting table 17 at the same rate at which the ribbon 7 is moving. While the movable carriage 56 is moving longitudinally in the direction in which the ribbon of clay 7 is moving, an operator may swing the handle 87 from the normal position illustrated, in a clockwise direction, to cause the lateral cutters 70 to engage with and cut the moving ribbon of clay 7 into the sections of different lengths as are determined by the spacing of the lateral cutters 70.

As the movable carriage 56 is forced away from the splitting table 17 a supporting plate 94, secured to the movable carriage 56 and slidable across the top plate 18 of the splitting table 17, constitutes a support for that portion of the ribbon 7 which lies between the table 17 and the carriage 56.

Figure 3:
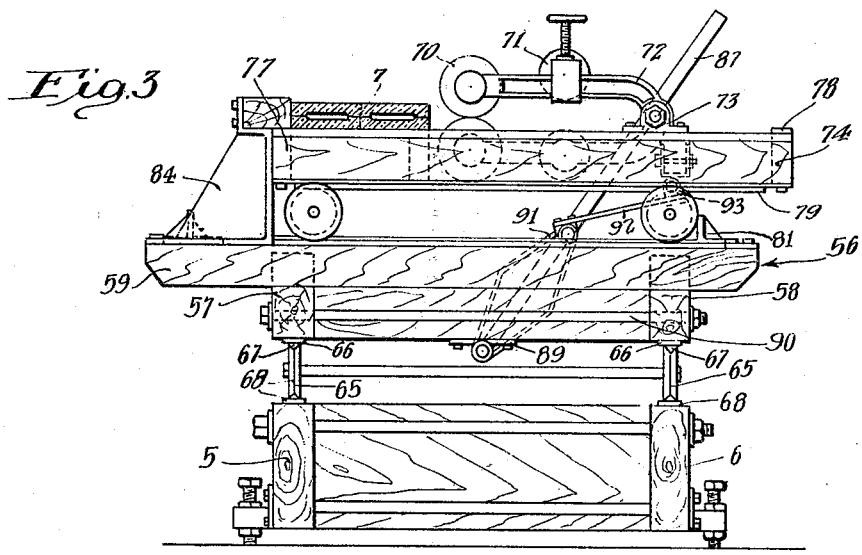
Fig. 3 is a vertical transverse section, taken through the apparatus shown in Fig. 1 along the plane indicated at 3—3.
Figure 4:
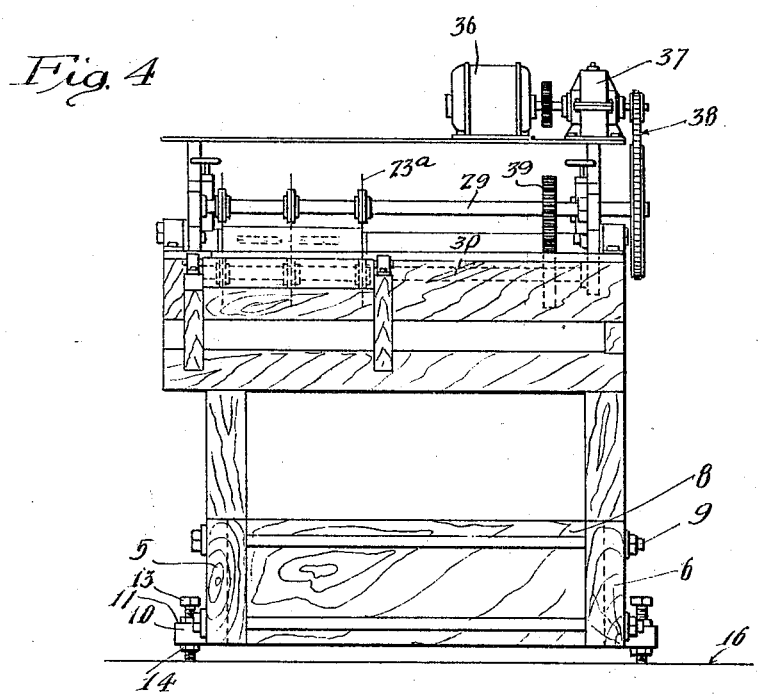
Fig. 4 is a vertical transverse section taken along the plane indicated at 4—4 of Fig. 1.

The lateral movement of the handle 87 in swinging the carrier 74 with respect to the moving ribbon 7, causes the top plate 82 of the carrier 74 to also move laterally with respect to the ribbon so that when the carrier is in its extreme right-hand position (see Fig. 3), the sections of the ribbon 7 which have been cut off, are now in the position illustrated in Fig. 1, and hence return of the carrier to the original right-hand position (see Fig. 3), moves the now cut sections of clay out of alinement with the ribbon 7.

When this movement of the cut sections occurs, the movable carriage 56 may again be pushed up to its abutting position with reference to the splitting table 17 and the continuously moving ribbon 7 passes a new section of ribbon into engagement with the stop bar 85 and the operation is repeated.

It will be observed that during all of the operations hereinbefore described, the ribbon of clay 7 was continuously moving even during the lateral cutting operation. That is, that the amount of movement allowed the carriage 56 is so proportioned that the rate of feeding of the ribbon 7 with a complete lateral cutting operation and return of the carrier 74 to its original position, can occur during the time required for the ribbon 7 to move through the limit of motion allowed to the movable carriage 56. Thus it will be observed that we have provided for the lateral cutting of the moving ribbon 7 and transfer of the cut sections without interrupting the continuous motion of the ribbon 7.

The cutting operation occurring without interrupting the movement of the ribbon of clay 7, is of extreme importance in the manufacture of tile or similar articles, since if it is required that the movement of the ribbon be interrupted to allow for the cross cutting of the clay, a large amount of time is lost in the manufacture of each set of sections of tile.

As hereinbefore explained, the first action of the carrier 74 in cutting off the first set of tiles from the moving ribbon 7, places these tiles in the position indicated at X in Fig. 1. The second movement of the carrier 74 to cut off a second section of the ribbon 7, causes the first set of tiles to abut the ribbon 7 and thus causes these tiles to be pushed to a further position along the carrier 74. As this occurs, the finishing or smoothing rollers 71 pass over the cross cuts of the tiles previously cut off from the ribbon 7 to finish the edges of these cuts. At the end of the second movement of the carrier 74 the first set of tiles cut off are in the position Y shown in Fig. 1. By inserting a pallet board 96, comprising a flat board to the ends of which are attached cleats 97 and 98, upon suitable supporting members 99 and 100 constituting a part of the carrier 74, with the top of the pallet board 96 in alinement with the top 82 of the carrier 74, the tile when moved into the position indicated at Y will be automatically placed upon the pallet board so that the board may be lifted out of the machine and carried to the drying oven, or other machines, which will perform other steps in the manufacturing process. The automatic transfer of the tile to the pallet board permits the complete separation of the ribbon of clay 7 into the various desired shapes, and facilitates the handling of the same without the necessity of manually touching any of the tile so formed, which, being in a plastic state, is liable to injury if an attempt is made to manually handle the same.

If desired, the space between the right-hand side of the top 82 of the movable carrier 74, and the pallet board 96, may be constituted of a thin metal plate 101 perforated to provide the necessary openings for the passage of the cutting discs 70 and the smoothing or finishing rollers 71 therethrough.

Since the carriage 74 is to be moved with respect to the guide 83, it is necessary that a suitable cut-away portion 102 be provided in the guide 83 to allow the passage of the stop bar 85 past this guide 83 when the carrier is to be moved to its extreme right-hand position. Also, it will be necessary to provide a series of cuts 103 in the guide 83 in alinement with the several cutting discs 70 which are employed on the carrier 74, so that these cutting discs may pass to the extreme right-hand edge of the ribbon of clay 7.

In the manufacture of tile, it is sometimes desirable to produce a tile which has relatively thick edges and relatively thin faces. Such tile may be readily manufactured with a machine of the character illustrated by providing the extruding machine 2 with a suitable coring device which produces a core opening in the center of the ribbon of clay 7. Then by arranging a cutting wire 104 with the mouth of the extruding machine 2 in such position as to split the ribbon 7 into upper and lower parts, the tile which will be formed as a result of the passage of the ribbon 7 over the splitting table 17 and the cross cutting carriage 56, will be of the desired web character, each cut producing an upper tile and a lower tile, each of which has a cut-away portion formed as a result of the coring of the ribbon of clay 7.

If it is desired, the passage of the ribbon of clay may be facilitated by properly lubricating the underneath side of the same, and for this purpose we have illustrated a lubricating roller 105 rotatably mounted in suitable bearings 106, the face of the roller 105 being arranged to rotate in a pan 107 which may be filled with water, oil or other lubricant suitable for lubricating the underneath side of the ribbon 7.

It is further desirable to produce a ribbon of clay finished on the upper and lower faces and which is longitudinally split by a wire stretched across the mouth of the auger machine. Such tile may be readily manufactured with a machine of the character illustrated by providing the extruding machine 2 with a cutting wire 104 across the mouth of the die to split the ribbon 7 into upper and lower parts. The tile which will be formed as a result of the passage of the ribbon 7 over the splitting table 17 and the cross cutting carriage 56, will have a roughened back, due to the friction of the cutting wire on the inner surface of the ribbon and may be split by the upper and lower cutting discs 23 into a plurality of tile not over one inch square. By this method, as many as five hundred and seventy-six pieces of tile may be produced and placed upon the pallet boards at each stroke of the handle 87, the lower face of the tile being upon the pallet board.

While we have illustrated and described our invention with reference to a tile manufacturing machine, it is to be understood that the illustration and description are illustrative of only the preferred embodiment of our invention, and we do not desire to be limited to any of the details shown herein, except as defined in the appended claims.

We claim:

1. A machine for producing predetermined shapes from a continuously feeding ribbon of plastic material comprising a table across which said ribbon of material is fed, rotatable cutters on said table for longitudinally cutting said ribbon into one or more strips as it is fed across said table, smoothing rollers beyond said cutters for smoothing the edges of said cut strips, a carriage movable in the direction of movement of said ribbon for receiving said strips, rotatable lateral cutters on said carriage, means for moving said lateral cutters laterally with respect to said carriage for cutting said strips laterally into short sections, and smoothing rollers movable with said lateral cutters for smoothing said cut sections.

2. A machine for producing predetermined shapes from a continuously feeding ribbon of plastic material comprising a table across which said ribbon of material is fed, cutters on said table for longitudinally cutting said ribbon into one or more strips as it is fed across said table, bridging means between said carriage and said table for supporting said ribbon during movement of said carriage, a carriage movable in the direction of movement of said ribbon for receiving said strips, lateral cutters on said carriage means for moving said lateral cutters laterally with respect to said carriage for cutting said strips into short sections while said ribbon is moving longitudinally.

3. A machine for producing predetermined shapes from a continuously feeding ribbon of plastic material comprising a table across which said ribbon of material is fed, means on said table for longitudinally cutting said ribbon into one or more strips of predetermined width comprising a frame, an upper set of cutting discs rotatably mounted on said frame, a lower set of cutting discs alined with and abutting said upper discs, and means for adjusting the position of said discs with respect to said table to aline the abutting point of said discs with the longitudinal cross sectional center of said ribbon of material.

4. A machine for producing predetermined shapes from a continuously feeding ribbon of plastic material comprising a table across which said ribbon of material is fed, means on said table for longitudinally cutting said ribbon into one or more strips comprising a pair of U-shaped frames pivoted to said table at the base of the U, a shaft extending between the corresponding upper edges of the two frames, a second shaft extending between the corresponding lower legs of the two frames, a plurality of cutting discs on said shafts rotatable with reference to said frame, said discs arranged in abutting pairs each including an upper disc and a lower disc, a finishing roller shaft extending between the corresponding upper legs of the two frames, a second finishing roller shaft extending between the corresponding lower legs of said frames, a plurality of finishing rollers on said shafts arranged in alined pairs of one upper roller and one lower roller, each of said finishing rollers being arranged to contact with the ribbon after the ribbon has passed said cutting discs, and means for adjusting the relative positions of each pair of rollers to correspond with the thickness of the ribbon of material.

Signed at South Gate, California, this 3rd day of July, 1930.

RUFUS B. KEELER.
RAE WARREN PHILLIPS.